(No Model.)
F. H. RICHARDS.
DRILL.
No. 419,883. Patented Jan. 21, 1890.
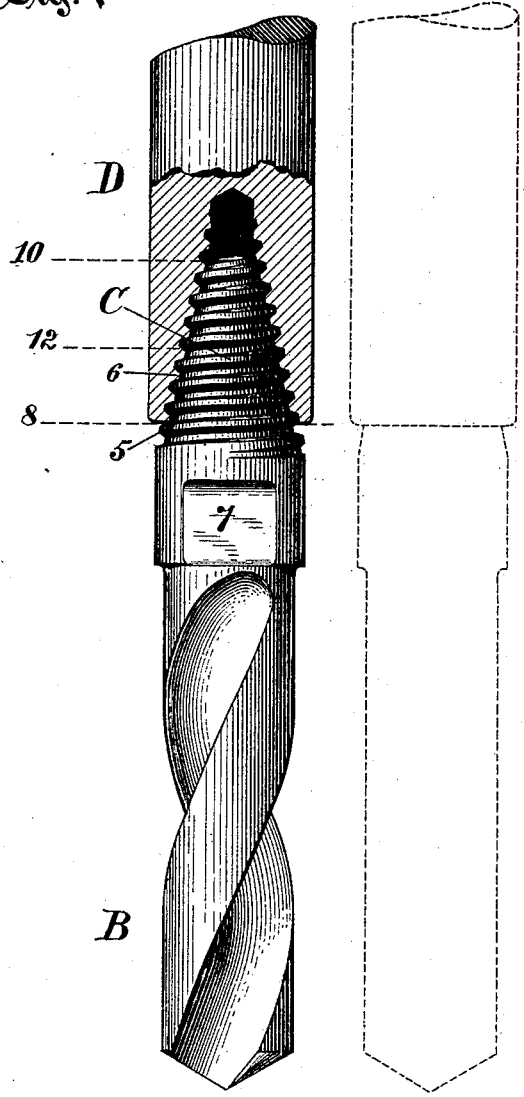
Witnesses:
W. M. Bjorkman
Henry L. Reckard
Inventor:
Francis H. Richards

UNITED STATES PATENT OFFICE.

FRANCIS H. RICHARDS, OF HARTFORD, CONNECTICUT, ASSIGNOR TO
ECKLEY B. COXE, OF DRIFTON, PENNSYLVANIA.

DRILL.

SPECIFICATION forming part of Letters Patent No. 419,883, dated January 21, 1890.

Application filed December 6, 1888. Serial No. 292,841. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Drills, of which the following is a specification.

This invention relates to drills and spindles for use in multiple-drilling machines, the object being to furnish a drill of that class which can be securely affixed to a drill-spindle that is little if any larger than the drill itself, so that the drills may be used for drilling holes in close proximity to each other.

In the drawings accompanying and forming a part of this specification, Figure 1 is a side elevation of a drill affixed in a drill-spindle and embodying my improvements. Fig. 2 is a dotted outline of a similar drill and spindle, standing in close proximity to that in Fig. 1, and is illustrative of the object and utility of the invention.

Similar characters designate like parts in both figures.

The cutting portion of my improved drill may be substantially the same as that portion of ordinary metal-drills. In the drawings such a part of a twist-drill is shown in Fig. 1, and is designated by B. This cutting part of the drill is provided with a shank, which is fitted into a drill-spindle D, properly bored to receive the same. The drill-shank C is formed tapering or conical, smallest at the upper end, and is provided with a screw-thread 5, which is fitted to engage the corresponding thread 6, formed within the conically-bored spindle D. The shank C below the spindle is usually flattened, substantially as shown at 7, to fit a wrench, (not shown,) whereby to remove the drill by unscrewing the same from the drill-socket.

It will be remembered that both the drill and the drill-spindle sustain the entire torsional strain due to turning the drill while at work, and that such entire strain takes place in the drill at point 8 and in the drill-spindle at point 10, these points being the lower and upper limits, respectively, of the drill-engaging part of the spindle; but since in my improvements the cross-sectional area of the spindle increases from point 8 to point 10 while that of the drill increases reversely from point 10 to point 8, and since the engagement of the drill with the spindle is continuous between said points, it follows that the strain at any particular intermediate point, as 12, will be reduced correspondingly to the reduction at such point of those areas. The transmission of the strain, therefore, takes place throughout the distance between said points 8 and 10, so that in practice the diameter of the spindle D can be reduced almost, as shown in the drawings, or quite to that of the drill itself. It will be observed, also, that the drill has no shoulders or other stops to limit its endwise movement, and that the whole extent of the surfaces which come into contact with the spindle is on the said screw-threads, so that the entire torsional strain is divided between the upper and lower surfaces after the manner of a wedge, and so that all tendency to strip the thread in the spindle by drawing on the same in a downward direction is avoided. It will of course be understood that the direction or pitch of the thread on the shank C must properly correspond with working movement of the drill.

Having thus described my invention, I claim—

1. A drill provided with cutting-lips adapted to operate by rotation and having a shank with a conical threaded portion to engage a correspondingly-shaped threaded recess in the drill-spindle, the part of the drill immediately adjoining the larger end of the threaded portion being of a diameter equal to or less than that of such end, substantially as and for the purpose specified.

2. A drill provided with cutting-lips adapted to operate by rotation and having a shank with a conical screw-threaded portion, the part of the drill immediately adjoining the larger end of the threaded portion being of a diameter equal to or less than that of such end, in combination with a spindle correspondingly bored and threaded to receive the threaded portion of the shank and to drive the drill by a pressure on both sides of the thread on said shank, substantially as and for the purpose shown.

FRANCIS H. RICHARDS.

Witnesses:
SAML. W. POWEL,
HENRY L. RECKARD.